US012785553B2

(12) United States Patent
Jouanneau

(10) Patent No.: US 12,785,553 B2
(45) Date of Patent: Nov. 3, 2026

(54) INTEGRATED CIRCUIT AND METHOD

(71) Applicant: STMicroelectronics International N.V., Geneva (CH)

(72) Inventor: Thomas Jouanneau, Jarrie (FR)

(73) Assignee: STMICROELECTRONICS (ALPS) SAS, Grenoble (FR)

( * ) Notice: Subject to any disclaimer, the term of this patent is extended or adjusted under 35 U.S.C. 154(b) by 0 days.

(21) Appl. No.: 19/022,849

(22) Filed: Jan. 15, 2025

(65) Prior Publication Data

US 2025/0246999 A1 Jul. 31, 2025

(30) Foreign Application Priority Data

Jan. 29, 2024 (FR) ...................................... 2400840

(51) Int. Cl.
*H02M 3/07* (2006.01)
*H02M 1/36* (2007.01)

(52) U.S. Cl.
CPC ............... *H02M 3/07* (2013.01); *H02M 1/36* (2013.01)

(58) Field of Classification Search
CPC ..... H02M 1/083; H02M 1/0045; H02M 3/156
See application file for complete search history.

(56) References Cited

U.S. PATENT DOCUMENTS

| | | | | |
|---|---|---|---|---|
| 5,422,590 | A | 6/1995 | Coffman et al. | |
| 6,255,896 | B1 | 7/2001 | Li et al. | |
| 2001/0015672 | A1 | 8/2001 | Rey et al. | |
| 2002/0079952 | A1 | 6/2002 | Zeng et al. | |
| 2005/0184795 | A1* | 8/2005 | Koshita | G11C 5/145 327/536 |
| 2006/0220729 | A1* | 10/2006 | Kim | G11C 5/143 327/536 |
| 2012/0313666 | A1* | 12/2012 | Thomas | G11C 27/02 327/94 |
| 2016/0013784 | A1* | 1/2016 | Jiang | H03L 7/0816 327/157 |
| 2016/0118879 | A1 | 4/2016 | De Cicco et al. | |

FOREIGN PATENT DOCUMENTS

JP 2007202256 A 8/2007

* cited by examiner

*Primary Examiner* — Sibin Chen
(74) *Attorney, Agent, or Firm* — Slater Matsil, LLP

(57) ABSTRACT

An integrated circuit includes: a charge pump including a transfer stage of the Pelliconi type capable of performing a cyclic charge transfer and controlled by control signals in order to generate an output voltage by raising an input voltage, and at least one control circuit configured to generate the respective control signals. The control circuit is further configured, during an initialization phase before the generation of the output voltage, to force the respective control signals to at least one respective initialization voltage suitable for starting the generation of the output voltage.

20 Claims, 5 Drawing Sheets

INTEGRATED CIRCUIT AND METHOD

CROSS-REFERENCE TO RELATED APPLICATIONS

This application claims the priority benefit of French Patent Application No. 2400840, filed on Jan. 29, 2024, entitled "PROCÉDÉ D'INITIALISATION D'UNE POMPE DE CHARGE ET CIRCUIT INTÉGRÉ CORRESPONDANT," which is hereby incorporated by reference to the maximum extent allowable by law.

TECHNICAL FIELD

The present invention relates generally to integrated circuits and, in particular embodiments, to a system and method for initialization of a charge pump.

BACKGROUND

A charge pump is typically used in low power devices such as certain microcontrollers or connected objects that are powered by relatively low power supply voltages (for example 1 volt). More particularly, the charge pump makes it possible, during operation, to generate from these power supply voltages higher power supply voltages (for example 2 volts) for the internal operation of these devices.

The correct operation of the charge pump is generally achieved when the internal voltages of the charge pump are initialized. The initialization of the internal voltages of the charge pump may however be relatively long, particularly for the architectures of the charge pump of which the internal voltages are generated on capacitive nodes.

Indeed, these capacitive nodes may be in a state known as "high impedance" during the initialization, that is to say a state wherein the voltages generated by these nodes are not controlled and therefore have undetermined values that may depend on parameters such as the current leakages of transistors or of capacitive couplings.

These internal voltage values may lead to blocking of the charge pump in a low-efficiency state that does not allow it to start operating. The initialization is therefore extended in order to make it possible for the charge pump to exit this low-efficiency state. For example, the initialization time for such architectures of the charge pump may be longer than 10 μs.

It may be possible not to initialize the internal voltages of the charge pump, but this risks the startup phase of the charge pump being extended, particularly according to the size of the components of the charge pump or rise times of the power supply voltages, and therefore does not make it possible to have a robust charge pump.

Another possibility for preventing an initialization time that is too long is to use high-voltage transistors able to withstand the power supply voltage provided by the charge pump and making it possible to speed up the initialization of internal voltages.

However, high-voltage transistors are bulky, degrade the energy efficiency of the charge pump due to associated parasitic capacities, and are controlled by high voltages of which the generation would require a dedicated raising stage, typically a charge pump, which would amount to shifting the problem without solving it.

SUMMARY

According to some embodiments, an integrated circuit is proposed including a charge pump including a transfer stage capable of performing a cyclic charge transfer and controlled by control signals, in order to generate an output voltage by raising an input voltage, and at least one control circuit configured to generate respective control signals, wherein said control circuit is further configured, during an initialization phase before said generation of the output voltage, in order to force said respective control signals to a respective initialization voltage suitable for starting said generation of the output voltage.

For example, the circuit may provide a first control circuit as input of the charge pump and, alone or in combination, a second control circuit as output of the charge pump.

The control circuit makes it possible to controllably impose the voltages of the control signals during the initialization phase in order to prevent the uncontrolled voltages, for example those induced by the capacitive coupling when the charge pump is deactivated, from causing blocking of the charge pump in the low-efficiency state.

Consequently, the charge pump returns to operating mode very rapidly after an initialization phase, due to the fact that the voltages of the control signals are imposed in order to not enter into the low-efficiency state generating a latency upon startup in order to exit therefrom.

According to one embodiment, the transfer stage is configured, in a controlled manner by said control signals, to cyclically switch a capacitive element into a state capable of being charged by the input voltage, and into a state capable of transferring its charge on the output voltage.

Such a transfer stage (of the Pelliconi type and known by the person skilled in the art) makes it possible for the charge pump to generate an output voltage higher than the input voltage, for example a rise in the input voltage by a factor 2.

According to one embodiment, a first control circuit is connected on an input of the charge pump and is configured to generate first control signals from the input voltage, the first control circuit being configured to generate said respective initialization voltage, known as input initialization voltage, during the initialization phase, the input initialization voltage being lower than or equal to the input voltage.

The first control circuit has the advantage of preventing a mechanism from blocking the initialization of the control signals, which may occur particularly when the initial voltage of at least one of the control signals has a positive and high value in relation to the input voltage.

Thus, by setting the voltage of the control signals at the ground voltage during the initialization phase, protection is provided against the conditions of the blocking mechanism mentioned above.

According to one embodiment, the first control circuit includes first switches coupling the first control signals with the input of the charge pump; and further includes an initialization circuit comprising second switches capable of coupling said first control signals with an input initialization voltage in a controlled manner by the input voltage.

Such an initialization circuit thus makes it possible to impose the input initialization voltage, for example the ground, on the first control signals. The second switches, which may be NMOS transistors for example, are consequently subjected to the input voltage on the one hand and the input initialization voltage on the other hand, and may thus be "low-voltage" transistors of the same type as the first switches.

According to one embodiment, a second control circuit is connected on an output of the charge pump and is configured to generate second control signals from the output voltage, the output stage of the control circuit being configured to generate said respective initialization voltage, known as output initialization voltage, the output initialization voltage being higher than or equal to the output voltage.

Similarly to the first control circuit, the second control circuit makes it possible to prevent the mechanism from blocking the initialization of the control signals, particularly those used to control the switching of the capacitive element into a state capable of transferring its charge on the output voltage.

However, the initial voltage of these control signals is set at the output voltage to prevent triggering the blocking mechanism that may occur as soon as at least one of the two control signals has an initial voltage value, for example a negative value, and more generally a value lower than the output voltage.

Thus, by setting the voltage of the control signals at a voltage higher than or equal to the output voltage during the initialization phase, it is possible for the control signals to reach a voltage suitable for starting the charge pump more rapidly by not triggering the blocking mechanism.

According to one embodiment, the second control circuit includes first switches coupling the second control signals with the output of the charge pump; and further includes an initialization circuit comprising second switches configured to couple said second control signals with the output of the charge pump during the initialization phase, and not outside of the initialization phase.

According to one embodiment, the second switches, which may be PMOS transistors for example, are consequently subjected to an initialization control voltage that may have the output voltage or an initialization control voltage, and also to the output voltage.

The initialization control voltage is provided particularly to control second switches under “low-voltage” conditions, the second switches thus being able to be made of transistors of the low voltage type, that is to say of the same type as the first switches.

According to one embodiment, the second control circuit comprises a timing circuit configured to generate the initialization control voltage controlling coupling of the second control signals with the output of the charge pump during a discharge period of the charge pump after switching off the generation of the output voltage.

The timing circuit makes it possible to maintain the initialization control voltage at the output voltage to prevent a voltage deviation from being generated between the terminals of the second switches that damages these second switches. For example when the second switches are PMOS transistors, the voltage deviation applied between the gate and the source of these PMOS transistors may be higher than the maximum voltage tolerated by these transistors.

At the end of the discharge period of the charge pump, the initialization control voltage may have the ground voltage without risk of damaging the second switches since the deviation between the initialization control voltage and the output voltage is lower than the maximum voltage tolerated by the second switches.

According to some embodiments, a method is proposed for initializing a charge pump including a transfer stage capable of performing a cyclic charge transfer and controlled by control signals in order to generate an output voltage by raising an input voltage, the method comprising an initialization phase, before starting said generation of the output voltage, forcing respective control signals to at least one respective initialization voltage suitable for starting said generation of the output voltage.

According to an embodiment, the cyclic charge transfer comprises cyclic switching, controlled by the control signals, of a capacitive element into a state capable of being charged by the input voltage, and into a state capable of transferring its charge on the output voltage. The sequencing of the control signals of such a pumping cell (of the Pelliconi type) is known by the person skilled in the art.

According to an embodiment, first control signals generated from the input voltage, are forced to the respective initialization voltage, known as input initialization voltage, during the initialization phase, the input initialization voltage being lower than or equal to the input voltage.

According to an embodiment, the first control signals are coupled to the input of the charge pump, the initialization phase forcing the first control signals to the input initialization voltage by coupling the first control signals with the input initialization voltage by means of switches controlled by the input voltage.

According to an embodiment, second control signals generated from the output voltage, are forced to the respective initialization voltage, known as output initialization voltage, during the initialization phase, the output initialization voltage being higher than or equal to the output voltage.

According to an embodiment, the second control signals are coupled with the output of the charge pump, the second control signals being forced to the output initialization voltage, by coupling the second control signals with the output of the charge pump by second switches during the initialization phase, and not outside of the initialization phase.

According to an embodiment, the second switches are controlled by an initialization control voltage that may have the output voltage or a ground voltage.

According to an embodiment, the control signals are coupled with the output of the charge pump during a discharge period of the charge pump after switching off the generation of the output voltage.

BRIEF DESCRIPTION OF THE DRAWINGS

The foregoing features and advantages, as well as others, will become apparent upon examining the detailed description of illustrative embodiments given for the purpose of illustration, without limitation, with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties. For the sake of clarity, only the steps and elements that are useful for the understanding of the described embodiments have been illustrated and described in detail.

It is desirable to achieve solutions making it possible to speed up the initialization of the charge pump without degrading the performance and the robustness of the charge pump, advantageously by means of low-voltage transistors.

Figure 1:
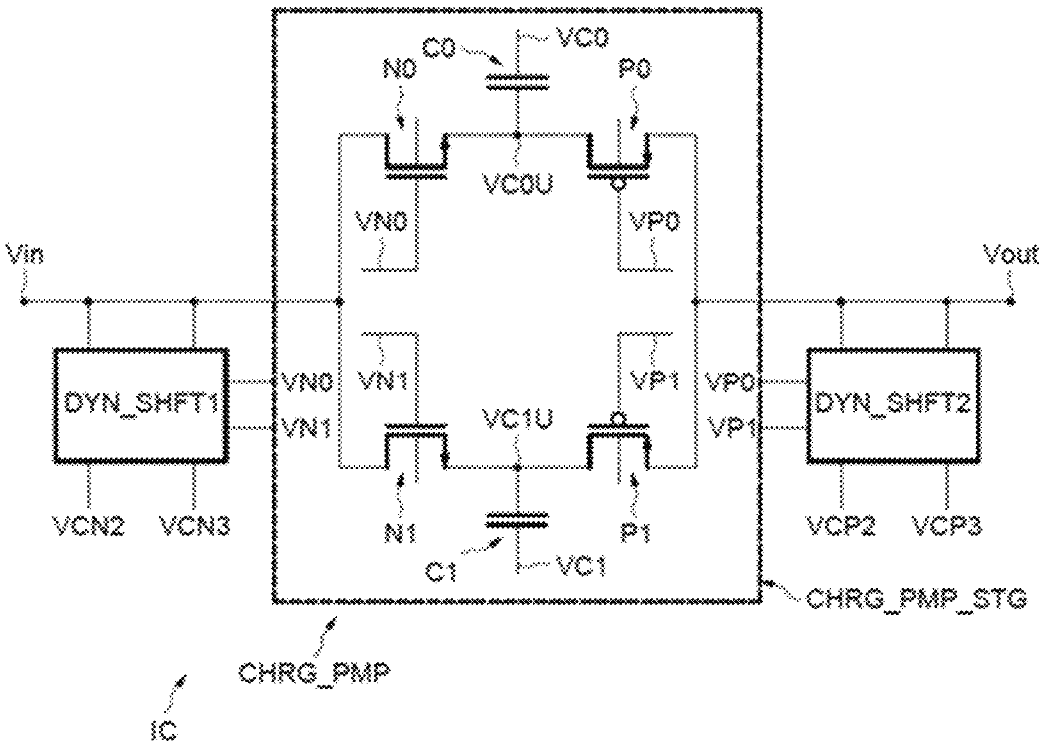
FIG. 1 schematically illustrates an integrated circuit, in accordance with some embodiments.

FIG. 1 schematically illustrates an integrated circuit IC according to one embodiment of the disclosure. The integrated circuit IC includes a charge pump CHRG_PMP.

The charge pump CHRG_PMP includes a transfer stage CHRG_PMP_STG capable of performing a cyclic charge transfer and controlled by control signals VN0, VN1, VP0, VP1, VC0, VC1. The control signals more particularly comprise first control signals VN0 and VN1 and second control signals VP0 and VP1.

This type of transfer stage CHRG_PMP_STG, of the Pelliconi type, is known by the person skilled in the art. It makes it possible to generate an output voltage Vout, for example of 2 V, by raising an input voltage Vin, for example of 1 V.

The transfer stage CHRG_PMP_STG is configured to cyclically switch a capacitive element such as a capacitor C0 and a capacitor C1, into a state capable of being charged by the input voltage Vin, and into a state capable of transferring its charge on the output voltage Vout. The cyclic switching of the capacitive element C0 controlled by said control signals VN0, VN1, VP0, VP1, VC0, VC1.

The sequencing of said control signals VN0, VN1, VP0, VP1, VC0, VC1 is known by the person skilled in the art and is given here by way of example and in the interest of understanding.

The first control signals VN0 and VN1 control the switching of the transistors N0 and N1 such that the capacitor C0 or C1 is connected to the input of the charge pump and is charged by the input voltage Vin. The signals VC0 or VC1 are then for example generated at a ground voltage so as to obtain a potential difference on the capacitive elements C0 or C1 equal to the input voltage Vin.

The second control signals VP0 and VP1 control the switching of the transistors P0 and P1 such that the capacitor C0 or C1 is connected to the output of the charge pump and transfers its charge on the output voltage Vout. The signals VC0 or VC1 are then for example generated at the input voltage Vin.

The control signals VN0, VN1, VP0 and VP1 typically have an operating voltage making it possible to switch the transistors N0, N1, P0 and P1, for example a voltage equal to twice the input voltage Vin, for example 2 V, during the operation of the charge pump, after an initialization phase.

The initialization phase represents the phase, before the startup of the charge pump, during which the control signals VN0, VN1, VP0 and VP1 are not yet stabilised at their useful operating values, called "setpoint values", starting from a substantially floating state (circuit shut down).

In particular, the startup of the charge pump corresponds to starting the generation of the output voltage Vout, typically initialized at the input voltage Vin.

The charge pump CHRG_PMP comprises a first control circuit DYN_SHFT1 connected to the input of the charge pump and a second control circuit DYN_SHFT2 connected to the output of the charge pump.

The first control circuit DYN_SHFT1 is configured to generate the first control signals VN0 and VN1 from the input voltage Vin, and first timing signals VCN2, VCN3.

The second control circuit DYN_SHFT2 is configured to generate second control signals VP0 and VP1 from the output voltage Vout, and second timing signals VCP2, VCP3.

The first control circuit DYN_SHFT1 is configured to force the control signals VN0, VN1 to an input initialization voltage V_INIT and the second control circuit DYN_SHFT2 is configured to force the control signals VP0 and VP1 to an output initialization voltage. The input initialization voltage and the output initialization voltage are suitable for starting the generation of the output voltage Vout, in the initialization phase.

The control signals then have during the initialization phase preceding the startup of the charge pump, initialization voltage values making it possible to prevent the triggering of conditions for blocking the structures used for generating the control signals.

The control signals VN0 and VN1 are therefore initialized at the input initialization voltage, which is lower than or equal to the input voltage Vin (for example the ground voltage), and the control signals VP0 and VP1 are therefore initialized at the output initialization voltage that is higher than or equal to the output voltage Vout (for example Vout).

Figure 2:
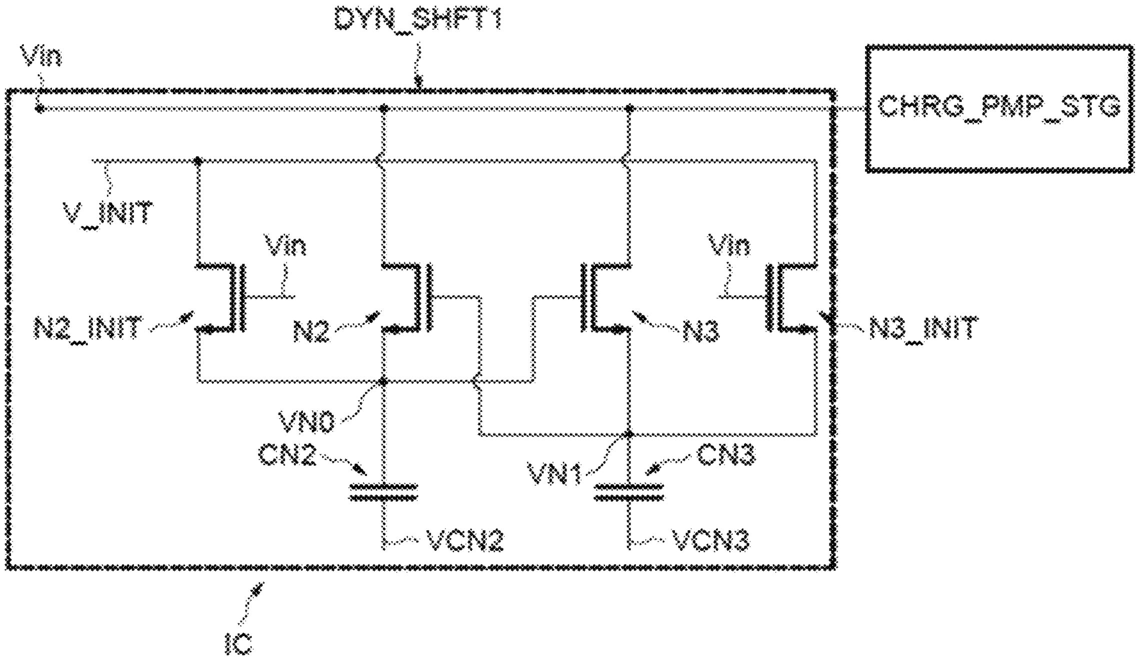
FIG. 2 schematically illustrates an example of a control circuit, in accordance with some embodiments.

FIG. 2 schematically illustrates an example of first control circuit DYN_SHFT1 as described above in relation to FIG. 1.

The first control circuit DYN_SHFT1 is configured to generate the input initialization voltage V_INIT at a voltage lower than or equal to the input voltage Vin during the initialization phase.

Yet, the first control circuit DYN_SHFT1 may be in a blocking state extending the duration of the initialization phase, if the initial conditions of the "floating levels" of the control signals VN0, VN1 are positive in relation to the input voltage Vin.

Thus, by setting the initial voltage of the control signals at the ground voltage, this prevents the risk of this potential blocking state.

The first control circuit DYN_SHFT1 includes first switches N2 and N3. The first switches N2 and N3 couple the first control signals VN0 and VN1 with the input of the charge pump. The first switches N2 and N3 are "low-voltage" NMOS transistors, that is to say transistors operating at relatively low-voltage ranges, in the order of the volt for example.

In particular, the first switches N2 and N3 and the nodes of the control signals VN0 and VN1, which may each be coupled to capacitive elements CN2 and CN3, form a dynamic level shifter structure, the design of which is known by a person skilled in the art. This person skilled in the art will know how to size the features of the transistors N2 and N3, capacitive elements CN2 and CN3, and will know how to generate first timing signals VCN2, VCN3 so as to ensure the operation of the level shifter.

The first control circuit DYN_SHFT1 further includes an initialization circuit comprising second switches N2_INIT and N3_INIT capable of coupling the first control signals VN0 and VN1 with the input initialization voltage V_INIT in a controlled manner by the input voltage Vin.

The second switches N2_INIT and N3_INIT are preferably "low-voltage" NMOS transistors that have features similar to the transistors N2 and N3. Advantageously, the input voltage Vin provided to the charge pump CHRG_PMP makes it possible to control the switching of the transistors N2_INIT and N3_INIT, for example by being applied on their respective gates.

Such an initialization circuit makes it possible to discharge the "floating levels" of the nodes of the control signals VN0 and VN1 for example when these nodes have a charge induced by the capacitive coupling or the leakage current of the transistors N2 and N3. Consequently, the first control signals VN0 and VN1 are forced to a voltage lower than or equal to the input voltage Vin, for example to the ground voltage, during the initialization phase.

At the end of the initialization phase, the input initialization voltage V_INIT may be chosen so as to switch the transistors N2_INIT and N3_INIT into a blocked state (open switch), for example by maintaining the input initialization voltage V_INIT at the input voltage Vin.

Consequently, the initialization circuit does not interfere in the operation of the charge pump CHRG_PMP after its startup.

Figure 3:
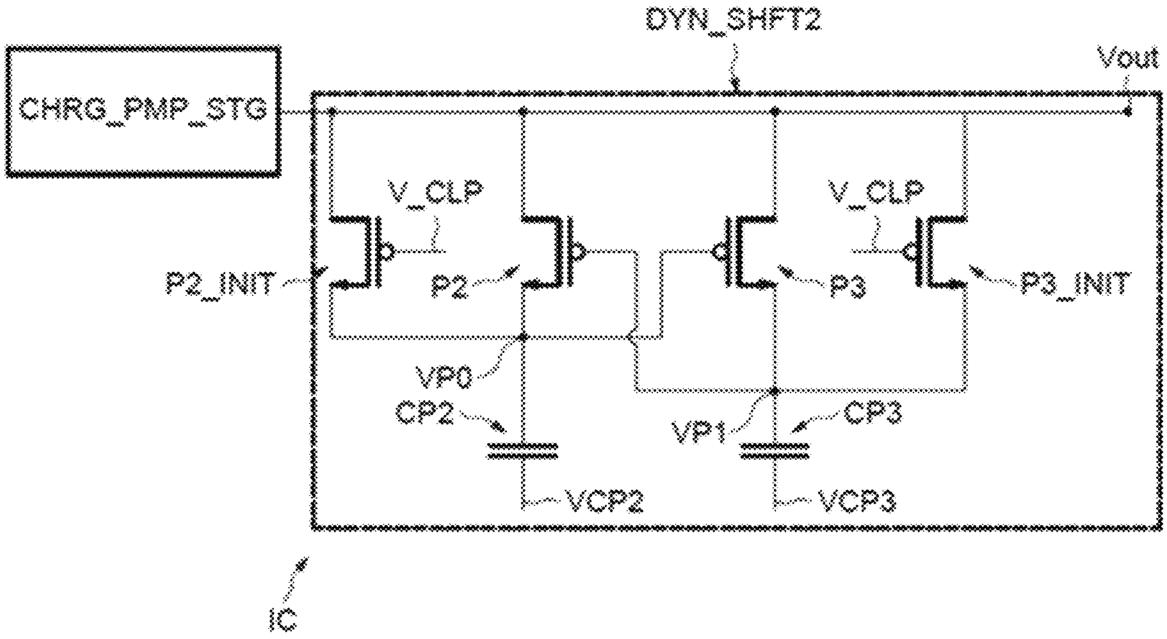
FIG. 3 schematically illustrates an example of another control circuit, in accordance with some embodiments.

FIG. 3 schematically illustrates an example of second control circuit DYN_SHFT2 as described above in relation to FIG. 1.

The second control circuit DYN_SHFT2 is configured to force the second control signals VP0 and VP1 to an output initialization voltage higher than or equal to the output voltage Vout during the initialization phase so as to prevent a blocking state during the startup of the charge pump.

The second control circuit DYN_SHFT2 includes first switches P2 and P3. The first switches P2 and P3 couple second control signals VP0 and VP1 with the input of the charge pump. The first switches P2 and P3 are "low-voltage" NMOS transistors.

In particular, the first switches P2 and P3 and the nodes of the control signals VP0 and VP1, which may each be coupled with capacitive elements CP2 and CP3, form a dynamic level shifter structure the design of which is known by the person skilled in the art, who will know how to size the features of the transistors P2 and P3, of the capacitive elements CP2 and CP3 connected to the nodes of the signals VP0 and VP1, and will know how to generate second timing signals VCP2, VCP3 in order to generate the second control signals VP0 and VP1.

The second control circuit DYN_SHFT2 further includes an initialization circuit comprising second switches P2_INIT and P3_INIT capable of coupling said second control signals VP0 and VP1 with the output of the charge pump during the initialization phase.

The second switches P2_INIT and P3_INIT are preferably "low-voltage" PMOS transistors that have the same dimensions as the transistors P2 and P3.

Such an initialization circuit makes it possible to charge or discharge the "floating levels" on the nodes of the signals VP0 and VP1 at a voltage higher than or equal to the output voltage Vout of the charge pump, which may initially have a charge induced by the capacitive coupling or the leakage current of the transistors P2 and P3, for example, during the initialization phase.

At the end of the initialization phase, the control signals VP0 and VP1 are no longer coupled with the output of the charge pump by the second switches P2_INIT and P3_INIT. Consequently, the initialization circuit does not interfere in the operation of the charge pump CHRG_PMP after its startup.

In this regard, the second switches P2_INIT and P3_INIT are controlled by an initialization control voltage V_CLP. More particularly, the initialization control voltage V_CLP may have the ground voltage during the initialization phase, such that the transistors P2_INIT and P3_INIT are in the conducting state. The initialization control voltage V_CLP may have the output voltage Vout outside of the initialization phase such that the transistors P2_INIT and P3_INIT are in the blocked state.

The initialization control voltage V_CLP (=ground voltage or =Vout) is particularly suitable for the voltage ranges supported by the "low-voltage" technology transistors since the potential differences at their terminals does not exceed Vout−Vin.

Moreover, the second control circuit DYN_SHFT2 may advantageously comprise a timing circuit configured to generate the initialization control voltage V_CLP.

Figure 4:
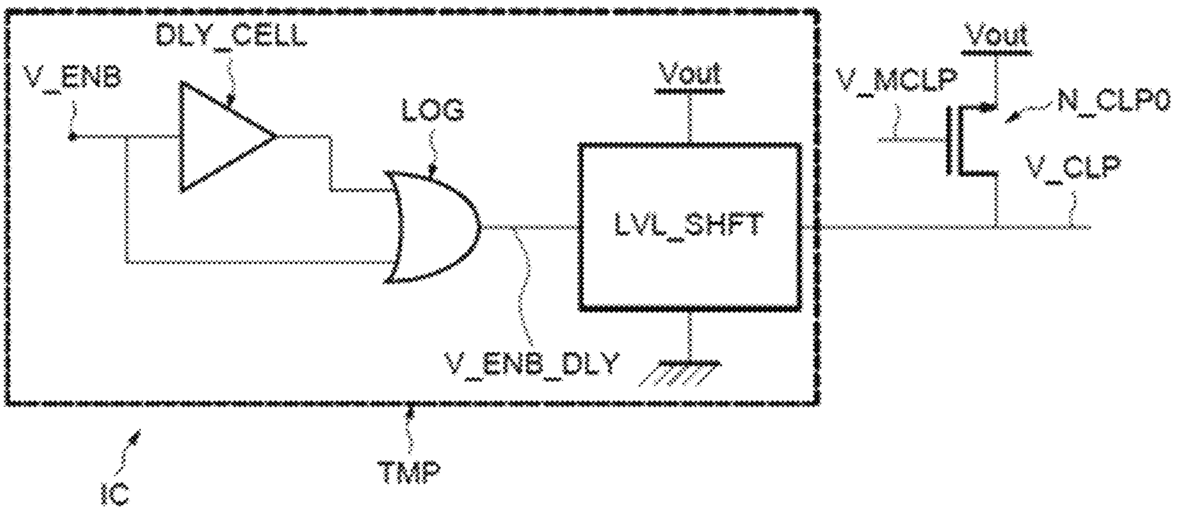
FIG. 4 schematically illustrates an example of a timing circuit, in accordance with some embodiments.

FIG. 4 schematically illustrates an example of timing circuit TMP of the second control circuit DYN_SHFT2.

The initialization control voltage V_CLP generated by the control circuit TMP controls a coupling of second control signals VP0 and VP1 with the output during a discharge period of the charge pump after switching off the generation of the output voltage Vout.

The timing circuit TMP comprises a delay cell DLY_CELL and a logic gate LOG of the "or" type configured together to generate a signal V_ENB_DLY having a time lag with a control signal V_ENB while switching off the generation of the output voltage Vout. The cell DLY_CELL, may be conventionally designed for example from filter circuit RC or an inverter chain, and advantageously configured so that the time lag of the signal V_ENB_DLY is at least equal to the discharge period of the charge pump CHRG_PMP.

Discharge period means a sufficient time interval so that the difference between the output voltage Vout and the ground voltage applied to the transistors P2_INIT and P3_INIT does not present a risk.

The timing circuit TMP also comprises a level shifter LVL_SHFT adaptor circuit, and any structure, from the moment that it makes a static operation of the adaptation of the level shifter possible. Such a circuit LVL_SHFT is particularly powered by the output voltage Vout and the ground voltage and is configured to generate, from the voltage V_ENB_DLY, the initialization control voltage V_CLP such that the voltage V_CLP has the output voltage Vout during the discharge period of the charge pump and has the ground voltage after this period.

Furthermore, the timing circuit TMP may advantageously comprise a third switch N_CLP0 configured to force the initialization control voltage V_CLP to the output voltage Vout at the end of the discharge period of the charge pump. Such a switch N_CLP0 makes it possible to overcome a possible lack of control of the circuit LVL_SHFT when the output voltage Vout is close to 0 V (then not allowing correct operation of the circuit LVL_SHFT) and to ensure that the initialization control voltage V_CLP is maintained at the input voltage Vin while switching off the charge pump CHRG_PMP.

Figure 5:
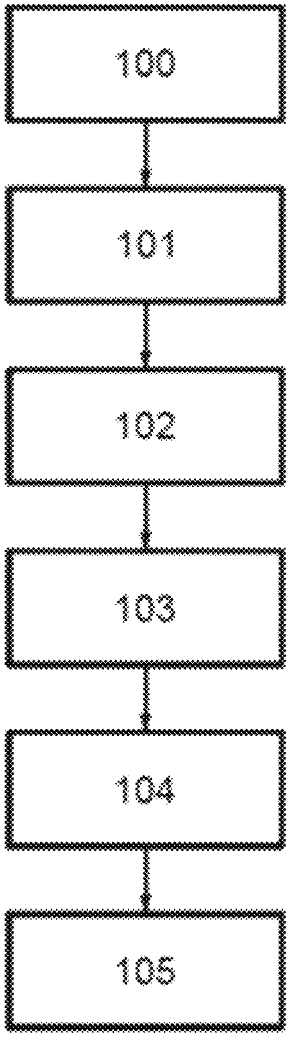
FIG. 5 schematically illustrates a flow chart diagram of a method for initializing a charge pump, in accordance with some embodiments.

FIG. 5 illustrates one example of the method for initializing the charge pump CHRG_PMP as described above in relation to FIGS. 1 to 4.

The method comprises steps 100 to 103 of an initialization phase, before starting said generation of the output voltage Vout, forcing the control signals VN0, VN1 to the input initialization voltage V_INIT and the control signals VP0 and VP1 to the output initialization voltage. The input initialization voltage and the output initialization voltage are suitable for starting the generation of the output voltage Vout.

The method comprises a step 101 of generating the first control signals VN0 and VN1 by the first control circuit DYN_SHFT1 during which the first control signals VN0 and VN1 are forced to the input initialization voltage V_INIT that is lower than or equal to the input voltage Vin, for example the ground voltage.

Step 101 comprises coupling the first control signals VN0 and VN1 with the input initialization voltage V_INIT by means of switches N2_INIT and N3_INIT controlled by the input voltage Vin.

The method comprises a step 102 of generating the second control signals VP0 and VP1 by the second control circuit DYN_SHFT2 during which the second control signals VP0 and VP1 are forced to the output initialization voltage that is higher than or equal to the output voltage Vout.

Step 102 comprises coupling the second control signals VP0, VP1 with the output of the charge pump Vout by the second switches P2_INIT, P3_INIT during the initialization phase such that the second control signals VP0 and VP1 are forced to the output voltage Vout.

The method comprises a step 103 of generating the initialization control voltage V_CLP capable of controlling the second switches P2_INIT and P3_INIT. The initialization control voltage V_CLP may have the ground voltage during the initialization phase.

The method comprises a step 104 of starting the charge pump CHRG_PMP that particularly comprises the cyclic charge transfer performed by the transfer stage CHRG_PMP_STG in order to generate the output voltage Vout by raising the input voltage Vin.

The charge transfer comprises cyclic switching, controlled by the control signals VN0, VN1, VP0, VP1, VC1, VC0, of the capacitive element C0, C1 into a state capable of being charged by the input voltage Vin, and into a state capable of transferring its charge on the output voltage Vout.

The method also comprises a step 105 of coupling the control signals VP0 and VP1 with the output of the charge pump during a discharge period of the charge pump after switching off the generation of the output voltage Vout.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. An integrated circuit comprising:

a charge pump comprising a transfer stage configured to perform a cyclic charge transfer in order to generate an output voltage by raising an input voltage, the cyclic charge transfer being controlled by control signals; and a first control circuit connected on an input of the charge pump, the first control circuit being configured to generate first control signals of the control signals from the input voltage, the first control circuit being further configured, during an initialization phase before the generation of the output voltage, to force the first control signals to a respective initialization voltage for starting the generation of the output voltage and to generate an input initialization voltage during the initialization phase, the input initialization voltage being lower than or equal to the input voltage, wherein the first control circuit comprises:

first switches coupling the first control signals with the input of the charge pump, and an initialization circuit comprising second switches configured to couple the first control signals with the input initialization voltage in a manner controlled by the input voltage.

2. The integrated circuit according to claim 1, wherein the transfer stage is configured to cyclically switch a capacitor into:

a state capable of being charged by the input voltage, and a state capable of transferring its charge on the output voltage.

3. The integrated circuit according to claim 1, wherein a second control circuit is connected on an output of the charge pump and is configured to generate second control signals of the control signals from the output voltage, an output stage of the second control circuit being configured to generate an output initialization voltage, the output initialization voltage being higher than or equal to the output voltage.

4. The integrated circuit according to claim 3, wherein the second control circuit comprises:

third switches coupling the second control signals with the output of the charge pump; and an initialization circuit comprising fourth switches configured to couple the second control signals with the output of the charge pump during the initialization phase.

5. The integrated circuit according to claim 4, wherein the fourth switches of the second control circuit are controlled by an initialization control voltage that is the output voltage or a ground voltage.

6. The integrated circuit according to claim 3, wherein the second control circuit comprises a timing circuit configured to generate an initialization control voltage controlling coupling of the second control signals with the output of the charge pump during a discharge period of the charge pump after switching off the generation of the output voltage.

7. The integrated circuit according to claim 6, wherein the timing circuit comprises a third switch configured to force the initialization control voltage to the output voltage at an end of the discharge period of the charge pump.

8. The integrated circuit according to claim 1, wherein each of the first control signals is coupled to a respective capacitive element at a corresponding node, the first switches and the respective capacitive elements together forming a dynamic level shifter.

9. A method for initializing a charge pump, the method comprising:

performing an initialization phase comprising forcing respective control signals to a respective initialization voltage for starting a generation of an output voltage, wherein first control signals of the control signals, the first control signals being generated from an input voltage, are forced to an input initialization voltage during the initialization phase, the input initialization voltage being lower than or equal to the input voltage, and wherein second control signals of the control signals, the second control signals being generated from the output voltage, are forced to an output initialization voltage during the initialization phase, the output initialization voltage being higher than or equal to the output voltage; and performing a cyclic charge transfer with a transfer stage of the charge pump, the cyclic charge transfer being controlled by the control signals to generate the output voltage by raising the input voltage.

10. The method according to claim 9, wherein the cyclic charge transfer comprises cyclic switching of a capacitive element of the charge pump, controlled by the control signals, into:

a state capable of being charged by the input voltage, and a state capable of transferring its charge on the output voltage.

11. The method according to claim 9, wherein the first control signals are coupled to an input of the charge pump, the initialization phase forcing the first control signals to the input initialization voltage by coupling the first control signals with the input initialization voltage by using switches controlled by the input voltage.

12. The method according to claim 11, wherein, at an end of the initialization phase, the input initialization voltage is set to the input voltage so as to open the coupling of the first control signals to the input initialization voltage.

13. The method according to claim 9, wherein the second control signals are coupled with an output of the charge pump, the second control signals being forced to the output initialization voltage by coupling the second control signals with the output of the charge pump by switches during the initialization phase.

14. The method according to claim 13, wherein the switches are controlled by an initialization control voltage that is the output voltage or a ground voltage.

15. The method according to claim 9, wherein the control signals are coupled with an output of the charge pump during a discharge period of the charge pump after switching off the generation of the output voltage.

16. The method according to claim 9, wherein the input initialization voltage is a ground voltage during the initialization phase.

17. A method for initializing a charge pump, the method comprising:

generating first control signals with a first control circuit, the first control circuit being coupled with the charge pump;

forcing the first control signals to an input initialization voltage lower than or equal to an input voltage;

generating second control signals with a second control circuit, the second control circuit being coupled with the charge pump;

starting a cyclic charge transfer of the charge pump, the cyclic charge transfer comprising cyclic switching controlled by the first control signals and the second control signals; and coupling the second control signals with an output of the charge pump during a discharge period of the charge pump.

18. The method according to claim 17, wherein the input initialization voltage is a ground voltage.

19. The method according to claim 17, wherein forcing the first control signals to the input initialization voltage comprises coupling the first control signals with the input initialization voltage by using switches controlled by the input voltage.

20. The method according to claim 17, wherein coupling the second control signals with the output of the charge pump is performed after switching off a generation of an output voltage of the charge pump.

* * * * *